April 14, 1964  G. ALFIERI  3,129,035
DEVICE FOR BRAKING EITHER REAR WHEEL OF
A VEHICLE WHEN TAKING A CURVE
Filed June 5, 1961  2 Sheets-Sheet 1
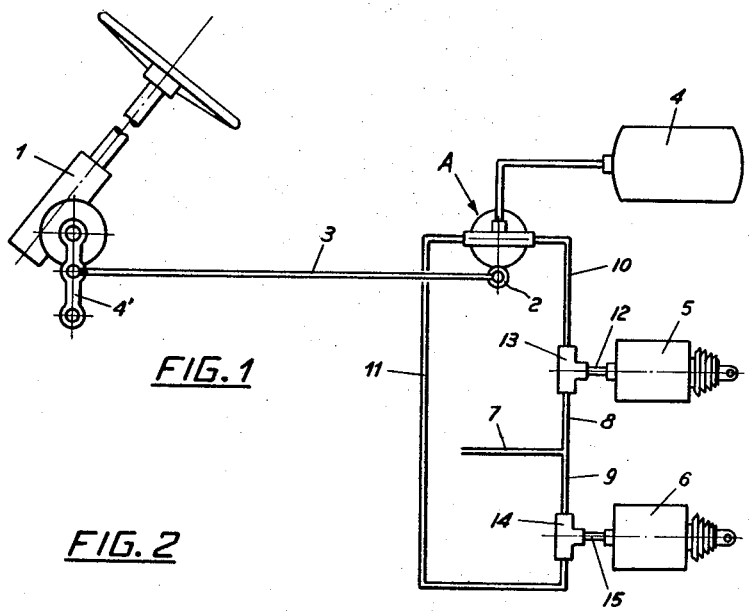
FIG. 1
FIG. 2
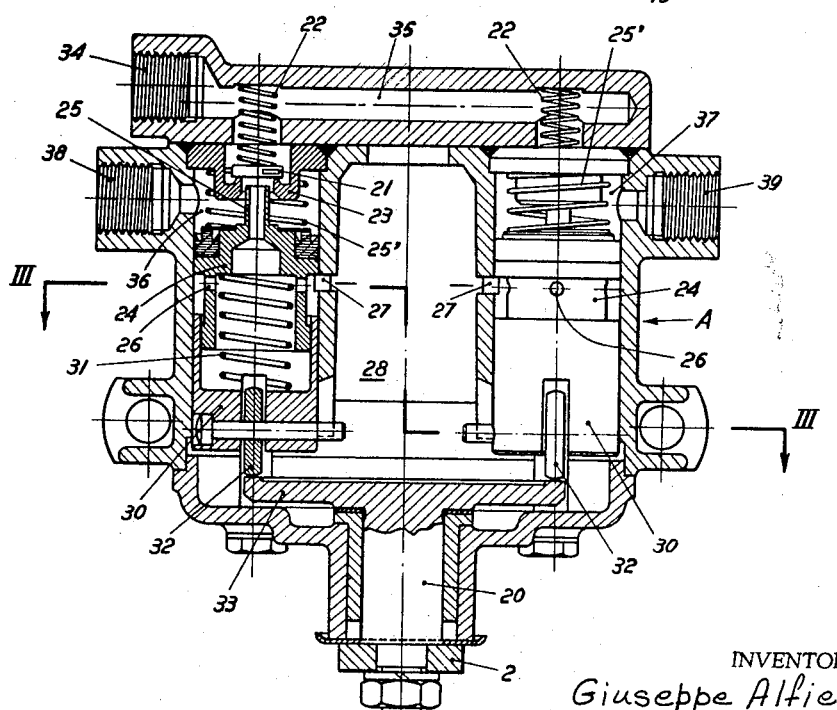
INVENTOR.
Giuseppe Alfieri
BY
Stevens, Davis, Miller + Mosher
ATTORNEYS

United States Patent Office 3,129,035
Patented Apr. 14, 1964

3,129,035
DEVICE FOR BRAKING EITHER REAR WHEEL OF A VEHICLE WHEN TAKING A CURVE
Giuseppe Alfieri, Milan, Italy, assignor to Fabbrica Italiana Magneti Marelli S.p.A., Milan, Italy, a corporation
Filed June 5, 1961, Ser. No. 114,981
Claims priority, application Italy June 24, 1960
3 Claims. (Cl. 303—6)

The present invention relates to a device for braking the rear inner wheel brake of a vehicle when taking a curve.

It is known that the possibility of controlling the guidance of a vehicle over a viscous or wet ground is reduced or nullified on account of the decrease of adherence of the wheels upon the ground.

It has been found by actual experience that by limitedly braking the rear wheel or wheels interior to the curve during the steering of the vehicle, the control of the direction of movement of the vehicle is improved.

The aim of the present invention is to provide a device which makes it possible to timely and efficiently brake either rear wheel of a vehicle concomitantly with the steering of the vehicle.

The structure of the invention is substantially characterized by the fact that it comprises two control means of the admission and discharge of a fluid under pressure to the brake wheel cylinders of the two rear wheels, which wheel cylinders are connected with the vehicle steering mechanism in such a manner that the afflux of the fluid to the brake of either wheel is possible only when steering is performed with a curvature of the trajectory of the vehicle having its center on the side of the braked wheel.

The invention will be described with reference to the appended drawings.

FIG. 1 is a schematic view of the device.

FIG. 2 is an axial section of a preferred form of embodiment of the distributor controlling the fluid under pressure to the braking means.

Figure 3:
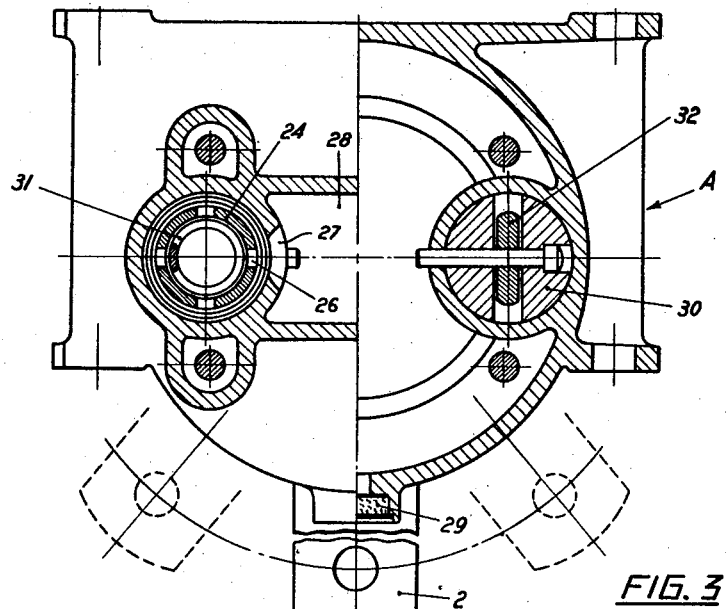
FIG. 3 is a cross section of the said distributor taken along the line III—III of the FIG. 2.

Referring to the drawings in general and more particularly to FIG. 1, the numeral 1 indicates a steering box of the vehicle. The two-section distributor A has the oscillating manipulating lever 2 connected by means of the rod 3 to the lever 4 fixed to the shaft projecting from the steering box.

The distributor A is supplied air under pressure from a reservoir 4 which may also supply the braking fluid for the normal braking means of the vehicle. The pneumatic wheel brake cylinders 5 and 6 take care in a known manner of the braking of the rear right and left rear wheels, respectively, of the vehicle and are fed in parallel from the conduit 7 of the usual brake system through the two branchings 8 and 9.

The distributor A provides two outlets which are connected through the conduit 10 to the cylinder 5 and through the conduit 11 to the cylinder 6.

The conduits 8 and 10 are connected, in turn to the conduit 12, feeding the cylinder 5 through a conventional three-way automatic valve which selectively connects together the conduits 8 and 12 and the conduits 10 and 12 depending upon whether the pressure is greater in the conduit 8 or in the conduit 10. A similar valve 14 controls the connection of the conduits 11 and 9 with the conduit 15 feeding the cylinder 6.

When the lever 2 of the distributor is in a middle position, as illustrated in FIG. 1, the two conduits 10 and 11 are discharging and, therefore, the conduit 7 of the brake is connected with the conduits 12 and 15 and the normal braking of the vehicle can be effected. When the lever 2 is angularly displaced in either direction to effect the steering of the vehicle, the connection of the compressed air reservoir 4 with the conduit 10 (or 11) to the cylinder 5 (or 6) for the braking of the wheel internal to the curve is effected.

The maximum feeding pressure of the braking elements is pre-established by the load of the adjusting springs with which the distributor A is provided (as will further on be described). Therefore, account being taken that the pressure of the auxiliary braking is limited, it is possible to obtain, due to the presence of the valves 13 and 14, when the vehicle is moving along both a straight stretch and in a curve, the normal braking on both of the rear wheels with a magnitude greater than that of the auxiliary braking.

Figure 4:
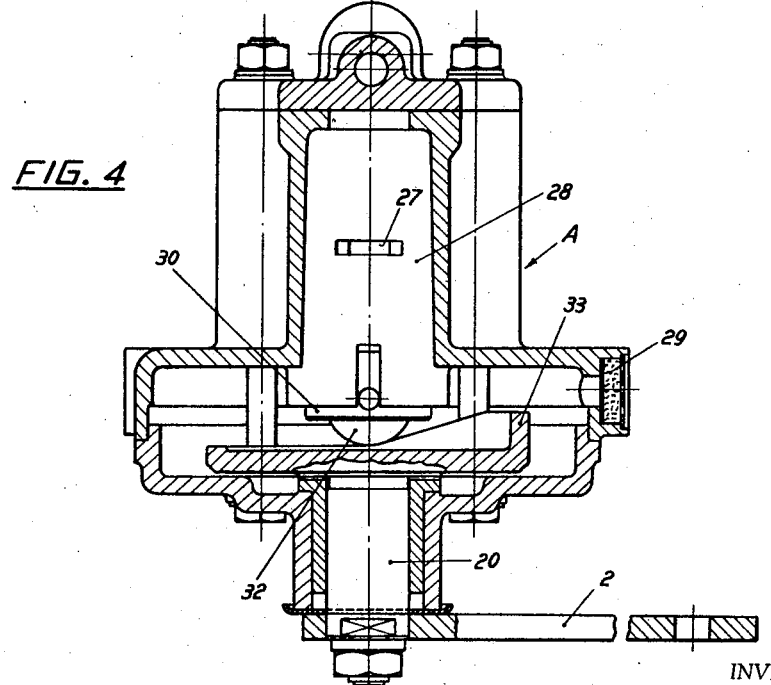
FIG. 4 is an axial section at 90° in respect to the one of FIG. 2 through the center thereof.

The FIGS. 2 and 4 represent a preferred form of embodiment of the distributor A, the body of which has two parallel axis valves, diametrally opposite in respect to the rotational axis of the manipulating shaft 20 upon which the actuating lever 2 is keyed.

Each valve comprises a valve member 21 pressed by the spring 22 against the valve seat 23.

Each valve also includes a cylindrical movable member 24 having a tubular extension 25 for the lifting of the valve member 21 from the valve seat thereof and is opposed by a return spring 25'. The member 24 is in communication, through the radial holes 26 and the slot 27 of the distributor body, with the central chamber 28 of the said body which is caused to communicate with the atmosphere through the filter 29.

The control of the member 24 is achieved by the action of a cup 30 through a helicoidal spring 31. The cup 30 has a roller 32 co-operating with a frontal cam 33 connected to the control shaft 20.

The reservoir 4 under pressure is connected by means of the fitting 34 with the chamber 35 of the distributor A upstream of the valve members 21. Downstream of the valve members 21 the chamber 36 or 37 communicates through the fitting 38 or 39 with the conduit 10 or 11, respectively to effect auxiliary steering breaking effect.

When the lever 2 is in its center position both of the valves of the distributor are closed, i.e. in the position illustrated in the FIG. 2.

The chambers 36 and 37 are each in communication with the atmosphere through the axial hole of the respective extension 25, while the respective inlet valve 21 is shut. Movement of the lever 2 causes the cam 33 to engage one of the rollers 32 and lift its respective cup 30. The spring 31 disposed in the cup 30 then moves member 24 upwardly and extension 25 unseats the respective valve member 21. The resting of the valve member 21 on the extension 25 closes the hole therethrough and at the same time effects the closure of the communication of the respectively one of the chambers 36 and 37 with the atmosphere. The chamber 36 or 37 is therefore put in communication with the compressed air reservoir 4 and the braking effect of the rear wheel internal to the curve is brought about. The maximum braking pressure is established by the load on the spring 31, which must react, in order to avoid the closure of the valve member 21, at the pressure that is exerted in the chamber 36 or 37 on the respective member 24.

Selecting, therefore, the load of the spring 31, it is possible to determine the desired braking effect upon the wheel internal to the curve. In practice, the particulars of the structure of the device may also be subjected to detail variants without leaving the ambit of the invention.

I claim:
1. A distributor device for automatically braking the internal rear wheel of a vehicle during the passage of the vehicle around a curve wherein the vehicle is of the type adapted to have a steering mechanism and rear wheel brake cylinders and a customary braking system including a brake line, said device comprising a distributor adapted to be connected to a pressurized source of brake fluid for selectively delivering brake fluid to the brake cylinders, said distributor being adapted to be connected to the steering mechanism of a vehicle, said distributor having an inlet adapted to receive a pressurized source of brake fluid, said distributor having two separate outlets adapted to communicate with brake cylinders, two separate valves disposed between said inlet and each of said outlets, a valve seat for each of said valves, a cylindrical hollow element mounted beneath each of said valves with a tubular extension, each of said extensions having a discharge port in communication with a port disposed in said distributor open to the atmosphere, each of said hollow elements normally communicating its respective discharge port to the atmosphere, and each of said tubular extensions having a tip engageable with its respective hollow element and unseat its respective valve member from its valve seat.

2. The device of claim 1 wherein a spring engages each of said hollow element and said hollow element is actuated through said spring whereby said spring controls the maximum pressure of fluid passing said valve member.

3. The device of claim 2 wherein said spring is actuated by a cam, said spring has one end seated in a cup, and said cup carries a roller engaged with said cam.

References Cited in the file of this patent

UNITED STATES PATENTS

| 2,394,343 | Vorech | Feb. 5, 1946 |
| 2,647,536 | Lunde | Aug. 4, 1953 |
| 3,031,234 | Alfieri | Apr. 24, 1962 |

FOREIGN PATENTS

| 482,470 | Germany | Sept. 13, 1929 |
| 825,650 | Germany | Dec. 20, 1951 |
| 410,589 | Italy | Apr. 17, 1945 |

UNITED STATES PATENT OFFICE
CERTIFICATE OF CORRECTION

Patent No. 3,129,035 April 14, 1964

Giuseppe Alfieri

It is hereby certified that error appears in the above numbered patent requiring correction and that the said Letters Patent should read as corrected below.

Column 1, line 48, for "lever 4" read -- lever 4' --; column 3, line 21, after "respective" insert -- valve member to close its respective --.

Signed and sealed this 1st day of June 1965.

(SEAL)
Attest:

ERNEST W. SWIDER
Attesting Officer

EDWARD J. BRENNER
Commissioner of Patents